(12) United States Patent
Lambert

(10) Patent No.: US 7,299,253 B2
(45) Date of Patent: Nov. 20, 2007

(54) SYSTEM AND METHOD FOR EFFICIENT BASIS CONVERSION

(75) Inventor: Robert J. Lambert, Cambridge (CA)

(73) Assignee: Certicom Corp., Mississauga (CA)

( * ) Notice: Subject to any disclaimer, the term of this patent is extended or adjusted under 35 U.S.C. 154(b) by 933 days.

(21) Appl. No.: 09/948,793

(22) Filed: Sep. 10, 2001

(65) Prior Publication Data

US 2002/0041682 A1    Apr. 11, 2002

Related U.S. Application Data

(63) Continuation of application No. PCT/CA00/00256, filed on Mar. 13, 2000.

(30) Foreign Application Priority Data

Mar. 12, 1999   (CA) .................................... 2265389

(51) Int. Cl.
*G06F 15/00* (2006.01)
(52) U.S. Cl. ........................................ 708/492; 380/44
(58) Field of Classification Search ........ 708/491–492; 380/44
See application file for complete search history.

(56) References Cited

U.S. PATENT DOCUMENTS

| | | | |
|---|---|---|---|
| 4,031,370 A | | 6/1977 | Catherall |
| 4,417,338 A | * | 11/1983 | Davida ......................... 380/286 |
| 4,847,801 A | * | 7/1989 | Tong ........................... 708/492 |
| 4,866,716 A | | 9/1989 | Weng |
| 5,485,474 A | * | 1/1996 | Rabin ........................... 714/762 |
| 5,761,102 A | * | 6/1998 | Weng ........................... 708/492 |
| 6,192,497 B1 | * | 2/2001 | Yang et al. ..................... 714/781 |
| 6,895,422 B2 | * | 5/2005 | Walster et al. ................ 708/446 |

FOREIGN PATENT DOCUMENTS

EP    0 806 838    11/1997

OTHER PUBLICATIONS

Eric W. Weisstein, "Polynomial." from MathWorld—A Wolfram Web Resource. http://mathworld.wolfram.com/Polynomial.html, no date filed.*

(Continued)

*Primary Examiner*—Chat C. Do
(74) *Attorney, Agent, or Firm*—Brett J. Slaney; John R. S. Orange; Blake, Cassels & Graydon LLP

(57) ABSTRACT

This invention describes a method for evaluating a polynomial in an extension field $F_q^M$, wherein the method comprises the steps of partitioning the polynomial into a plurality of parts, each part is comprised of smaller polynomials using a $q^{-th}$ power operation in a field of characteristic q; and computing for each part components of $q^{-th}$ powers from components of smaller powers. A further embodiment of the invention provides for a method of converting a field element represented in terms of a first basis to its representation in a second basis, comprising the steps of partitioning a polynomial, being a polynomial in the second basis, into a plurality of parts, wherein each part is comprised of smaller polynomials using a $q^{-th}$ power operation in a field of characteristic q; evaluating the polynomial at a root thereof by computing for each part components of $q^{-th}$ powers from components of smaller powers; and evaluating the field element at the root of the polynomial.

24 Claims, 4 Drawing Sheets

OTHER PUBLICATIONS

Agnew, G. B. et al., "An Implementation of Elliptic Curve Cryptosystems over F2155," IEEE Journal of Selected Areas in Communications, Jun. 1993, pp. 804-813, vol. 11, No. 5.

Lu, E. H. et al., "VLSI Architectures for computing Polynomials in GF(2n)," International Conference on Systems Engineering, 1987, pp. 555-558, IEEE, New York, US.

Kovac, M. et al., "Ace: A VLSI Chip for Galois Field GF(2m) Based Exponentiation," IEEE Transactions on Circuits and Systems II: Analog and Digital Signal Processing, Apr. 1996, pp. 289-297, vol. 43, No. 4, IEEE, New York, US.

* cited by examiner

| $a_9\ r^9$ | | | |
|---|---|---|---|
| $a_7\ r^7$ | | | |
| $a_5\ r^5$ | $a_{10}\ r^{10}$ | | |
| $a_3\ r^3$ | $a_6\ r^6$ | | |
| $a_1\ r^1$ | $a_2\ r^2$ | $a_4\ r^4$ | $a_8\ r^8$ |

$a_0\ r^0$

FIG. 2a $A \leftarrow 0$ $A \leftarrow a_8\ r^1$ $A \leftarrow A^2$ $A \leftarrow A + a_4\ r^1$ $A \leftarrow A^2$ $A \leftarrow A + a_2\ r^1 + a_6\ r^3 + a_{10}\ r^5$ $A \leftarrow A^2$ $A \leftarrow A + a_1\ r^1 + a_3\ r^3 + a_5\ r^5 + a_7\ r^7 + a_9\ r^9 + a_0\ r^0$

FIG. 2b

| $a_{16}\ r^{16}$ | | |
|---|---|---|
| $a_{14}\ r^{14}$ | | |
| $a_{13}\ r^{13}$ | | |
| $a_{11}\ r^{11}$ | | |
| $a_{10}\ r^{10}$ | | |
| $a_8\ r^8$ | | |
| $a_7\ r^7$ | | |
| $a_5\ r^5$ | $a_{15}\ r^{15}$ | |
| $a_4\ r^4$ | $a_{12}\ r^{12}$ | |
| $a_2\ r^2$ | $a_6\ r^6$ | |
| $a_1\ r^1$ | $a_3\ r^3$ | $a_9\ r^9$ |
| $a_0\ r^0$ | | |

FIG. 3a $A \leftarrow 0$ $A \leftarrow a_9\ r^1$ $A \leftarrow A^3$ $A \leftarrow A + a_3\ r^1 + a_6\ r^2 + a_{12}\ r^4 + a_{15}\ r^5$ $A \leftarrow A^3$ $A \leftarrow A + a_0\ r^0 + a_1\ r^1 + a_2\ r^2 + a_4\ r^4 + a_5\ r^5$
$\qquad + a_7\ r^7 + a_8\ r^8 + a_{10}\ r^{10} + a_{11}\ r^{11}$
$\qquad + a_{13}\ r^{13} + a_{16}\ r^{16}$

FIG. 3b

SYSTEM AND METHOD FOR EFFICIENT BASIS CONVERSION

CROSS-REFERENCES TO RELATED APPLICATIONS

This application is a continuation of PCT Application No. PCT/CA00/00256 filed on Mar. 13, 2000, and published as WO 00/55756 on Sep. 21, 2000; and claims priority from Canadian Patent Application No. 2,265,389 filed Mar. 12, 1999.

TECHNICAL FIELD

This invention relates to the field of cryptographic systems, and conversion of elements between bases used in such systems.

BACKGROUND OF THE INVENTION

It is well known that there is only one finite field of any given order, but that there are many different representations. When an extension field is built by adjoining a root of an irreducible polynomial to the ground field, the choice of irreducible affects the representation of the extension field. In general if $F_{q^m}$ is the finite field, where q is a prime and $F_q$ is the ground field over which it is defined, the elements of the finite field can be represented in a number of ways depending on the choice of basis. In order to interoperate, cryptographic systems employing finite fields often need to establish a common representation. In addition to the choice of irreducible polynomial, finite fields can also be represented by either polynomial or normal basis. A polynomial basis represents elements of $F_{q^m}$ as linear combinations of the powers of a generator element x: $\{x^0, x^1, \ldots, x^{m-1}\}$. A normal basis representation represents elements as linear combination of successive q-th powers of the generator element x: $\{x^{q^0}, x^{q^1}, \ldots, x^{q^{m-1}}\}$. Each basis has its own advantages, and cryptographic implementations may prefer one or the other, or indeed specific types of irreducible polynomials, such as trinomials or pentanomials.

To support secure communication between devices using different representations, basis conversion, which changes the representation used by one party into that used by another party is generally required.

Basis conversion often entails the evaluation of a polynomial expression at a given finite field element. If an element a, when represented as a polynomial, is given as $a(x)=\Sigma a_i x^i$ mod f(x), where f(x) is an irreducible, in one basis, then the conversion of the element a into a new representation using another irreducible polynomial requires that a be evaluated at r, where r is a root of the new irreducible polynomial in the field represented by f(x), then a(r) is the element a in the new representation. Any of the conjugates of r (the other roots of the new irreducible) will also induce equivalent, but different representations.

There is a need for an efficient method for evaluating these polynomials, for application to basis conversion.

SUMMARY OF THE INVENTION

In accordance with this invention there is provided a method for evaluating polynomials in an extension field comprising the steps of: partitioning the polynomials into a plurality of parts, such that each part may be computed from smaller polynomials using a q-th power operation in a field of characteristic q.

In accordance with a further embodiment of the invention there is provided a method for evaluating a polynomial in an extension field comprising the steps of computing components of the q-th powers from components of smaller powers.

BRIEF DESCRIPTION OF THE DRAWINGS

These and other features of the preferred embodiments of the invention will become more apparent in the following detailed description in which reference is made to the appended drawings wherein:

FIGS. 2(a) and 2(b) are schematic diagrams illustrating an embodiment of the invention;

FIGS. 3(a) and (b) are schematic diagrams of further embodiments of the invention.

DETAILED DESCRIPTION OF THE PREFERRED EMBODIMENTS

Figure 1:
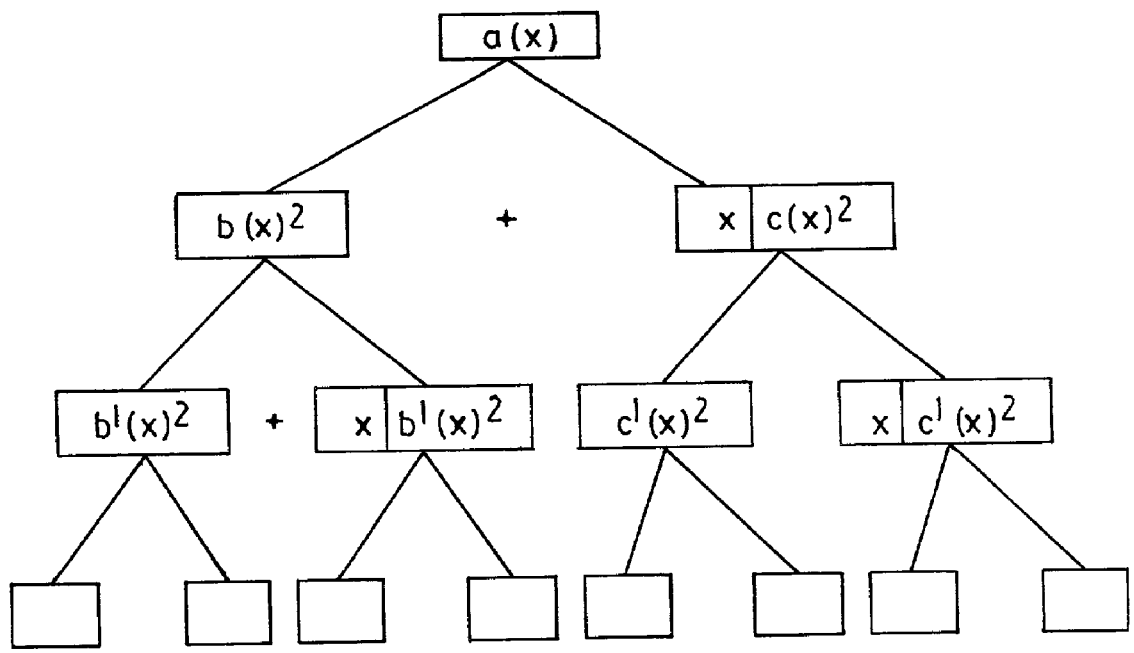
FIG. 1 is a schematic diagram illustrating an embodiment of the present invention.

In a first embodiment of the invention, we exemplify a specific case $F_{2^m}$ of the general field $F_{q^m}$, then in order to evaluate a field element $a(x)=\Sigma a_i x^i$ in $F_{2^m}$, it is noted that approximately one half of the exponents $x^i$ are even powers. These powers can be efficiently calculated from lower degree exponents of odd powers. For example, the powers for i=2,4,6,8,10 can be calculated by squaring the powers for i=1,2,3,4,5, respectively. This approach does not apply to the odd powers, but if we partition a into even and odd powers, e.g. $a(x)=a_{even}(x)+a_{odd}(x)$, and if we factor x from the odd powers, then a will be represented by a sum of even powers and x times a sum of even powers.

Explicitly, $$a(x) = (a_0 + a_2 x^2 + a_4 x^4 + \ldots ) + x(a_1 + a_3 x^2 + a_5 x^4 + \ldots )$$
$$= a_{even}(x) + x a'_{even}(x)$$

where $a'_{even}(x)$ is the even-powered polynomial derived by factoring x from $a_{odd}(x)$.

In a field of characteristic 2, $F_{2^m}$ squaring is a linear operation, which allows $a_{even}$ and $a'_{even}$ to be expressed as squares of polynomials of smaller (roughly one half) degree. Explicitly, defining $b(x)=a_0+a_2 x+a_4 x^2+a_6 x^3+\ldots$ and $c(x)=a_1+a_3 x+a_5 x^2+a_7 x^3+\ldots$, then a(x) can be expressed as $a(x)=(b(x))^2+x(c(x))^2$. Now b and c have approximately half the degree of the original polynomial a to be evaluated.

Evaluation of b (and c) can (recursively) be made by further dividing the polynomial into odd and even parts. The odd part can be shifted to an even power by factoring out x and expressing the result as a combination of squares of lower degree polynomials. At each application of the partitioning and shifting two squaring operations and one multiplication by x are required.

At some point, the recursive partitioning can be halted and the component polynomials evaluated via one or more methods.

Note that although we have described the method for the extension fields over $F_2$, similar application can be made to other characteristics if the polynomials are divided into more components. For example, for the extension held over $F_3$, the polynomial a(x) might be divided into $a(x)=a_{0\ mod\ 3}+a_{1\ mod\ 3}+a_{2\ mod\ 3}$, where $$a_{0\ mod\ 3}=(a_0+a_3x^3+a_6x^6\ldots)a_{1\ mod\ 3}=(a_1x+a_4x^4+a_7x^7\ldots), \text{ and } a_{2\ mod\ 3}=(a_2x+a_5x^5+a_8x^8\ldots).$$

In general, for extension fields over $F_q$ the polynomial may be divided into q parts. Even over characteristic 2, the polynomial a might be broken up into more than 2 polynomials, at the cost of more multiplications by x or powers of x.

As an example of a preferred embodiment at a given size, consider conversion of polynomial representations over $F_{2^{163}}$. An element of this field is represented by the polynomial $$a(x)=a_0+a_1x+a_2x^2+\ldots a_{162}x^{162}.$$

The first branching divides a(x) into:

$$a(x) = (a_0 + a_2x + a_4x^2 + a_6x^3 + \ldots + a_{162}x^{81})^2 +$$
$$x(a_1 + a_3x + a_5x^2 + a_7x^3 + \ldots + a_{161}x^{80})^2$$
$$= (b(x))^2 + x(c(x))^2,$$

where b(x) and c(x) are each polynomials referred to as component polynomials $C_i$, $C_j$. At the next level down, $$b(x) = (b_0 + b_2x + b_4x^2 + b_6x^3 + \ldots + b_{80}x^{40})^2 +$$
$$x(b_1 + b_3x + b_5x^2 + b_7x^3 + \ldots + b_{81}x^{40})^2$$
$$= (d(x))^2 + x(e(x))^2.$$

The polynomial c(x) is partitioned in a similar way.

As mentioned above, the partitioning of polynomials into parts may be halted and the resulting component polynomials evaluated at a root by using any one of several known methods. The positions at which the partitioning stops may be denoted as the leaves of the evaluation tree. The component polynomials at the leaves may be evaluated either directly, or with Horner's rule. However, current methods do not exploit a property of finite fields of characteristic q, wherein taking the q-th powers is usually an efficient operation.

An exemplary method will now be described for efficiently evaluating a component polynomial for extension fields over $F_2$.

At the leaf, a component polynomial $a(x)=\Sigma a_i x^i$ must be evaluated at a root of a new irreducible. Again, approximately one half of these terms will be even and can be calculated efficiently from odd powers. These odd powers will either be stored, for explicit basis conversion, or calculated explicitly by multiplication. If, for example a(x) is guaranteed to be of degree not greater than 10 (which may be the case if certain evaluation tree depths are employed), then a(x) can be evaluated from the powers 1,3,5,7,9, which are either stored or calculated. Squarings can be reduced by grouping coefficients together. This is shown schematically in FIG. 2(a) where a notional table is constructed to show the relationship between the stored or evaluated odd powers of r and the higher degree even powers of r. Thus, consider the first row in which $r^2$, $r^4$ and $r^8$ are derived by squaring $r^1$; similarly, $r^6$ is derived by squaring $r^3$ and $r^{10}$ is derived by squaring $r^5$. It is to be noted that in this example, powers of 2 are used.

Turning back to FIG. 2(a), however, the notional table may be used as shown schematically in FIG. 2(b). Thus, assume an accumulator is set initially to 0. Since we are using an extension field over $F_2$ the coefficients $a_i$ are either 0 or 1. First, if $a_8$ is 1, then $r^1$ is added to the accumulator, which consists of a copying operation in a processor. Next, the accumulator is squared. Next, if $a_4$ is 1, then $r^1$ is added into the accumulator. Again, the accumulator is squared. Now, if $a_2$, $a_6$, $a_{10}$ are one (1) then $r^1$, $r^3$, $r^5$ are added into the accumulator respectively. Again, the accumulator is squared. Finally, if $a_0$, $a_1$, $a_3$, $a_5$, $a_7$, $a_9$ are set (1), then $r^0$, $r^1$, $r^3$, $r^5$, $r^7$, $r^9$ are added into the accumulator. This completes the evaluation o a(x) at r, requiring three squares and the initial evaluation of $r^0, r^1, r^3, r^5, r^7, r^9$, which can be reused at another leaf evaluation.

It will be apparent to those skilled in the art that the precomputed values technique can equally well be applied to multiplication techniques.

For polynomials of larger degrees, similar evaluations can be made from evaluation of odd powers. First, the coefficients of those exponents with the largest powers of 2 are added into the accumulator according to whether the polynomial to be evaluated has non-zero coefficients at those powers, then the result is squared. Next, powers divisible by one less power of 2 are added in as required by polynomial evaluation. Accumulation and squaring continues until the odd powers themselves are added in as required by the polynomial under evaluation.

In FIGS. 3(a) and 3(b), a similar evaluation is exemplified for an extension field over $F_3$ and for a polynomial of degree no greater than 17. Note that in this embodiment, the coefficients $a_i$ may take a value 0, 1, or 2. Thus, the powers are added with the required coefficients. In general then, for an extension field over $F_q$, powers of q are used to construct the notional table and evaluation of the polynomial proceeds by accumulation and q powering until all required powers in the polynomial are added in as required by the polynomial being evaluated.

An application of the above method to basis conversion may be illustrated as below. Given a field $F_{2^{31}}$ and a pair of bases having respective irreducible $f_1$ and $f_2$ and if $f_1=x^{31}+x^6+1$; and $f_2=x^{31}+x^3+1$. Then, a root of $f_1$ in the field represented by $f_2$ is given by $r=x^{26}+x^{24}+x^{23}+x^{22}+x^{19}+x^{17}+x^{12}+x^{11}+x^9+x^8+x^6+x^5+x^3+x^2$. Now, to convert an element $a(x)=a_{f_1}$ in the first basis to a representation in the second basis $a_{f_2}$ (that is to basis defined by $f_2$) we proceed as follows. Let $$a(x) = \sum_{i=0}^{30} a_i x^i$$

in general. For this example, we choose a specific element:

$$a(x)=x^{30}+x^{29}+x^{28}+x^{27}+x^{25}+x^{22}+x^{20}+x^{19}+x^{14}+x^{13}+x^{12}+x^{11}+x^{10}+x^8+x^7+x^6+x^3+x^0$$

Figure 4:
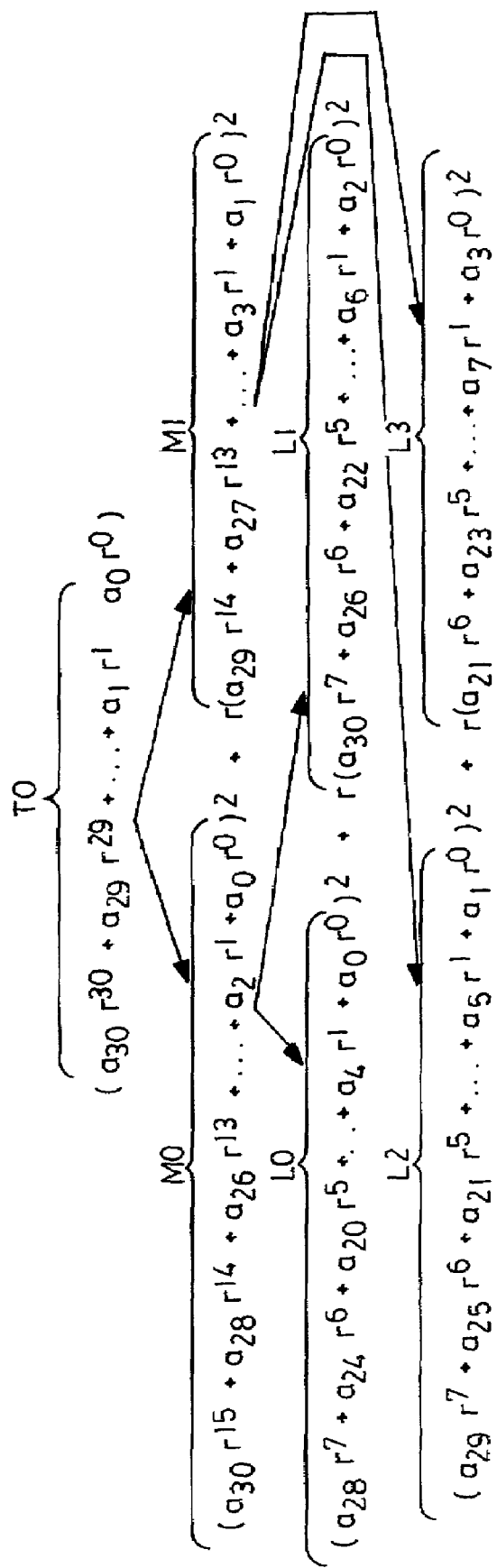
FIG. 4 is a schematic diagram of a three level tree according to an embodiment of the invention.

We assume a three level evaluation tree which is constructed in accordance with the present invention as shown in FIG. 4. At the bottom level of the tree (the leaf nodes), we require the following powers of r: $r^0, r^1, r^2 \ldots r^7$. The odd powers are calculated $r^1$, $r^3$, $r^5$, and $r^7$ (by squaring r and 3 multiplications by $r^2$).

When a above is decomposed in the tree, the leaf nodes are:

$$L_0=(r^7+r^5+r^3+r^2+1)^2$$

$$L_1=r(r^7+r^5+r^3+r^2+r)^2$$

$$L_2=(r^7+r^3)^2$$

$$L_3=r(r^6+r^5+r^4+r^2+r+1)^2$$

To evaluate the leaf node $L_0$, we will evaluate the component polynomial, then square it and, when appropriate, further multiply its value by r to obtain the value of the leaf node:
0) zero A
1) add $r^1$ to A, square A, now $A=r^2$
2) add in $r^0$, $r^3$, $r^5$, $r^7$ to A
3) square $A=L_0$ For $L_1$, we will
0) zero A
1) add $r^1$ to A
2) square A
3) add $r^1$, $r^3$, $r^5$, $r^7$, to A
4) square A
5) multiply A by r=L1 for $L_2$
0) zero A
1) add in $r^3$, $r^7$
2) square $A=L_2$ for $L_3$
0) zero A
1) add in $r^1$
2) square $A=r^2$
3) add in $r^1$, $r^3$
4) square $A=r^6+r^4+r^2$
5) add in $r^0$, $r^1$, $r^5$
   $A=r^6+r^5+r^4+r^2+r+1$
6) square A
7) multiply A by $r=L_3$ Now a(r) is built by evaluating the tree $M_0=(L_0+L_1)^2$, $M_1=r(L_2+L_3)^2$. Finally, $a(r)=T_0=M_0+M_1$.

Thus, it may be seen that his method may be applied to various cryptographic schemes such as key exchange schemes, signature schemes and encryption schemes.

Although the invention has been described with reference to certain specific embodiments, various modifications thereof will be apparent to those skilled in the art without departing from the spirit and scope of the invention as outlined in the claims appended hereto. For example, the invention may be applied to basis conversion wherein the bases to be converted between are an optimal normal basis and a polynomial basis.

The embodiments of the invention in which an exclusive property or privilege is claimed are defined as follows:

1. A method for converting an element of a finite field of characteristic q stored in a cryptographic system from a representation in a first basis defined by a first irreducible polynomial to a representation in a second basis defined by a second irreducible polynomial, wherein said representation in said second basic is to be used in a cryptographic scheme, said method comprising the steps of:
   a) obtaining said element from said cryptographic system;
   b) representing said element of said finite field in said first basis as a polynomial a(x);
   c) determining a root r of said second irreducible polynomial;
   d) evaluating said polynomial a(x) at said root r to obtain a representation a(r) of a(x) in said second basis for use in said cryptographic system; said evaluation being characterised by the steps of:
   e) partitioning said polynomial a(x) into a plurality of component polynomials, such that said polynomial a(x) is recoverable by combining said plurality of component polynomials using the operations of multiplication by x and exponentiation by q;
   f) obtaining values of each of said component polynomials by evaluating each of said component polynomials at said root r;
   g) computing the value of a(r) from said values of said component polynomials at said root r, using the operations of multiplication by r and exponentiation by q and;
   h) providing said representation a(r) in said second basis to said cryptographic scheme.

2. A method according to claim 1, wherein the evaluation of said component polynomials comprises evaluating said component polynomials directly.

3. A method according to claim 1, wherein the evaluation of said component polynomials comprises using Horner's rule to evaluate said component polynomials.

4. A method according to claim 1, wherein said polynomial a(x) is partitioned into q component polynomials $C_0$, $C_1, \ldots, C_{q-1}$.

5. A method according to claim 4, wherein said component polynomials are combined using the formula $a(r)=(C_0(r))^q+r(C_1(r))^q+r^2(C_1(r))^q+ \ldots +r^{q-1}(C_{q-1}(r))^q$.

6. A method according to claim 1, wherein said polynomial a(x) is partitioned into $q^2$ component polynomials $C_0$, $C_1, \ldots, C_{q^2-1}$.

7. A method according to claim 6, wherein said component polynomials are combined using the formula $$a(r) = \sum_{i=0}^{q-1} r^i \left( \sum_{j=0}^{q-1} r^j (C_{j+qi}(r))^q \right)^q.$$

8. A method according to claim 1, wherein said finite field is $F_{2^m}$ and said characteristic q is equal to 2.

9. A method according to claim 8, wherein said polynomial a(x) is partitioned into 2 component polynomials b(x) and c(x).

10. A method according to claim 9, wherein said component polynomials are combined using the formula $a(r)=(b(r))^2+r(c(r))^2$.

11. A method according to claim 8, wherein said polynomial a(x) is partitioned into 4 component polynomials $C_0$, $C_1, C_2, C_3$.

12. A method according to claim 11, wherein said component polynomials are combined using the formula $a(r)= (C_0(r))^2+r(C_1(r))^2+r((C_2(r))^2+r(C_3(r))^2)^2$.

13. A method according to claim 8, wherein said finite field is $F_{2^{163}}$.

14. The method of claim 1, in which the evaluation of the component polynomials is further characterised by the steps of:
   a) determining a set of exponents of x appearing in the component polynomial, such that all exponents appearing in said component polynomial are q-multiples of the exponents in said set of exponents;

b) computing the exponentiation of r to the exponents in the set of exponents to obtain a first set of exponentiations;

c) computing the exponentiation of r to q-multiples of the exponents in said set of exponents to obtain a second set of exponentiations, the computation using the first set of exponentiations and the operation of exponentiation by q; and d) combining said first and second sets of exponentiations in accordance with said component polynomial to obtain the value of evaluation of said component polynomial.

15. A method according to claim 14, wherein said finite field is $F_{2^m}$ whereby said characteristic q is equal to 2.

16. A method according to claim 15, wherein said finite field is $F_{2^{163}}$.

17. A method according to claim 15, wherein a set of exponentiations by odd exponents is precomputed and used for multiple basis conversions.

18. A method according to claim 1 wherein said cryptographic scheme is any one of a key exchange scheme, a signature scheme, and an encryption scheme.

19. A method for evaluating a first irreducible polynomial a(x) at a root r to obtain a representation a(r) of a second irreducible in a second basis, said method to be used in a cryptographic scheme for converting an element of a finite field of characteristic q, stored in a cryptographic system from a representation in a first basis defined by said first irreducible polynomial to a representation in said second basis defined by said second irreducible polynomial, said method for evaluating comprising the steps of:

a) obtaining said first irreducible polynomial a(x) and determining said root r of said second irreducible polynomial from said cryptographic system, said first irreducible polynomial representing said element of said finite field in said first basis;

b) partitioning said first irreducible polynomial a(x) into a plurality of component polynomials, such that said first irreducible polynomial a(x) is recoverable by combining said plurality of component polynomials using operations of multiplication by x and exponentiation by q, said first irreducible polynomial a(x) representing an element of a finite field of characteristic q in a first basis;

c) obtaining values of each of said component polynomials by evaluating each of said component polynomials at said root r;

d) computing the value of a second irreducible polynomial a(r) in a second basis from the values of said component polynomials at said root r using operations of multiplication by r and exponentiation by q and;

e) providing said second irreducible polynomial a(r) to said cryptographic scheme.

20. A method according to claim 19, wherein the computation of said component polynomials further comprises the steps of:

a) determining a set of exponents of x appearing in the component polynomial, such that all exponents appearing in said component polynomial are q-multiples of the exponents in said set of exponents;

b) computing the exponentiation of r to the exponents in the set of exponents to obtain a first set of exponentiations;

c) computing the exponentiation of r to q-multiples of the exponents in said set of exponents to obtain a second set of exponentiations, the computation using the first set of exponentiations and the operation of exponentiation by q; and d) combining said first and second sets of exponentiations in accordance with said component polynomial to obtain the value of evaluation of said component polynomial.

21. A method according to claim 19 wherein said cryptographic scheme is any one of a key exchange scheme, a signature scheme, and an encryption scheme.

22. In a cryptographic system utilizing a first irreducible polynomial a(x) for converting an element of a finite field of characteristic q stored in said cryptographic system from a representation in a first basis defined by said first irreducible polynomial to a representation in a second basis defined by a second irreducible polynomial, the method of evaluating said first irreducible polynomial a(x) at a root r of said field to obtain a representation a(r) of said second irreducible polynomial in said second basis to be used in a cryptographic scheme comprising the steps of:

a) obtaining said first irreducible polynomial a(x) and determining said root r of said second irreducible polynomial from said cryptographic system, said first irreducible polynomial representing said element of said finite field in said first basis;

b) partitioning said first irreducible polynomial a(x) into a plurality of component polynomials, such that said first irreducible polynomial a(x) is recoverable by combining said plurality of component polynomials using operations of multiplication by x and exponentiation by q, said first irreducible polynomial a(x) representing an element of a finite field of characteristic q in a first basis;

c) obtaining values of each of said component polynomials by evaluating each of said component polynomials at said root r;

d) computing the value of a second irreducible polynomial a(r) in a second basis from the values of said component polynomials at said root r using operations of multiplication by r and exponentiation by q and;

e) providing said second irreducible polynomial a(r) to said cryptographic scheme.

23. A method according to claim 22, wherein the computation of said component polynomials further comprises the steps of:

a) determining a set of exponents of x appearing in the component polynomial, such that all exponents appearing in said component polynomial are q-multiples of the exponents in said set of exponents;

b) computing the exponentiation of r to the exponents in the set of exponents to obtain a first set of exponentiations;

c) computing the exponentiation of r to q-multiples of the exponents in the set of exponents to obtain a second set of exponentiations, the computation using the first set of exponentiations and the operation of exponentiation by q; and d) combining said first and second sets of exponentiations in accordance with said component polynomial to obtain the value of evaluation of said component polynomial.

24. A method according to claim 22 wherein said cryptographic scheme is any one of a key exchange scheme, a signature scheme, and an encryption scheme.

* * * * *